Dec. 2, 1952          A. G. HOMA          2,619,761

FISHING SPINNER LURE

Filed May 28, 1947

INVENTOR,
Adam G. Homa,
BY

Patented Dec. 2, 1952

2,619,761

UNITED STATES PATENT OFFICE 2,619,761

FISHING SPINNER LURE

Adam G. Homa, Brooklyn, N. Y.

Application May 28, 1947, Serial No. 751,015

1 Claim. (Cl. 43—42.19)

This invention relates to an improved general purpose fishing lure, and one especially efficient for catching fresh water game fish and salt water fish.

A prime object is to provide such a device employing a spinner whose rotation is independent of the fishing line and avoids snarling of the latter.

Another object is to provide a novel spinner element having a tail so disposed as to enable water to flow through the inside of the spinner unobstructed, and the spinner to rotate with minimum friction, allowing the spinner to thus rotate on its own center, and one which will be better supported to withstand greater casting abuse.

Further, an object is to provide the spinner with a plurality of spoons or spherical portions so arranged that when the lure is retrieved and water flows through the inside of the spoon unmolested the spinner will rotate in a different direction each time it is stopped and started.

Again, an object is to provide a sinker equipped with a novel sleeve projecting beyond the same to enclose the joint between the sinker and the hook.

Figure 1:
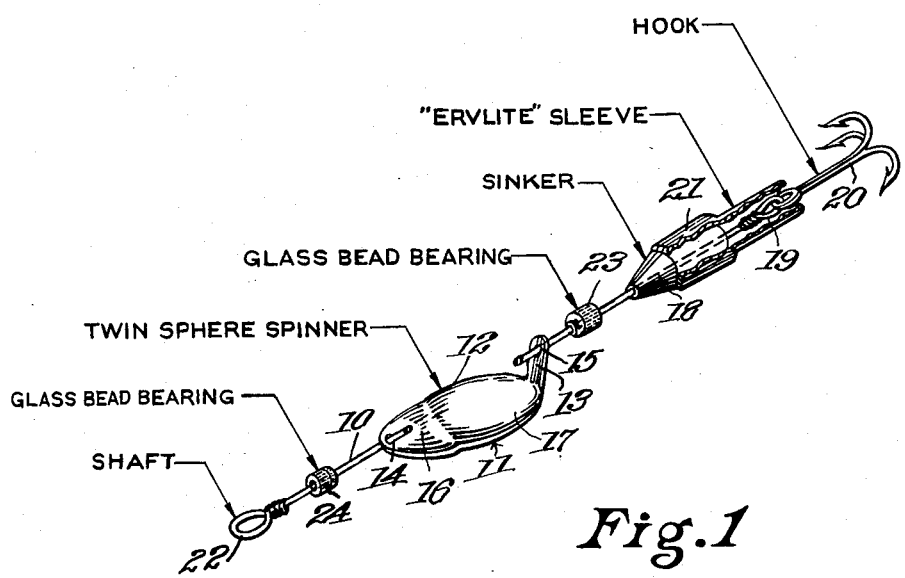
Figure 2:
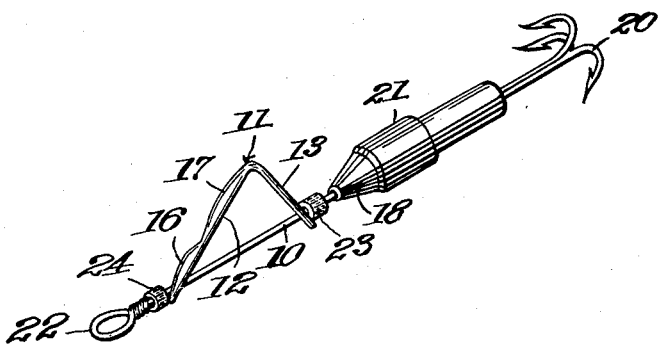

Various additional objects and advantages will become apparent from a consideration of the description following taken in connection with the accompanying drawings illustrating an operative embodiment by way of example:

In said drawings:

Figure 1 is a perspective view showing the parts constituting the invention disassembled and certain of them partly broken away to disclose details; and Figure 2 is a perspective view of the lure.

Referring specifically to the drawings, a shaft or rod preferably of stainless steel is employed at 10, carrying a spinner element of stainless steel, brass, cold-rolled steel, or any other suitable material. Spinner element 11, for example, may be about .015 inch thick and gold-plated, chromium plated and/or highly polished.

Said spinner element 11 includes a body 12 and a tail 13 extending angularly therefrom. Adjacent the outer ends of said body and tail are openings 14 and 15 respectively, through which shaft 10 passes, whereby the spinner is swiveled on such shaft. Said body 12 consists of a plurality of spoons or approximately spherical portions 16 and 17, whose concavities face the shaft, the portion 17 being larger than at 16 and located between the latter and tail 13.

Said shaft 10 has a sinker 18 of lead or the like strung thereon, and the lower end of the shaft is twisted to form an eyelet 19 to which normal conventional or other suitable hooks to catch the fish are loosely anchored. Shrunk or otherwise secured to the sinker 18 and extending beyond the same and enclosing the eyelet 18 and upper end of hook 20 is a sleeve 21 of "Ervlite" or other plastic or suitable material which may also be of any desired color or combination of colors.

The upper end of rod 10 is twisted to form an eyelet 22 so that the fishing line may be fastened or anchored to the lure.

Strung rotatably on shaft 10 between the tail 13 and sinker 18 and between the eyelet 22 and spoon 16 are bead bearings 23 and 24, respectively, preferably of glass or stainless steel.

In the use of the device when anchored to a fishing line at eyelet 22, and the same is drawn through the water, tail 13 so disposes the spinner that water flows through the inside of the latter unobstructed and the spinner rotates with minimum friction. The spaced bearings 23 and 24 allow the spinner to rotate on its own center or longitudinal axis and therefore the complete lure will not rotate but only the spinner element, avoiding tangling of the fishing-line. The bearing beads and their engagement with the tail and body of the spinner provide greater rigidity for the spinner and enables the latter to withstand a greater casting abuse. When the line is retrieved through the water, the latter flows through the inside of the spinner unmolested by the tail, and the spinner will rotate in a different direction, left or right, each time it is stopped and started.

Obviously the lure can be produced in any size for bait-casting or trolling, and the spinner element may be mounted and used other than specifically as shown herein.

Various changes may be resorted to provided they fall within the spirit and scope of the invention.

I claim as my invention:

A lure having a shaft, a spinner having a one-piece body with a relatively narrow tail integral with said body and extending laterally from one end thereof, said body and tail each having an opening constituting a bearing for said shaft, the edges of the bottom surface of the body being in a plane, the edges of the forward surface of the tail being in another plane, and the axis of the shaft being in a plane which intersects the other planes so that the lines of intersection of said planes define a triangle, said body having a plurality of depressed portions with concavities facing the shaft, one of said depressed portions being shorter and of less width than the other and having one of said openings therethrough, the other depressed portion being of the maximum width of the body, said tail having the other of said openings therethrough adjacent its distal end, and said shaft passing through said openings in such a manner that the spinner is rotatable thereon.

ADAM G. HOMA.

REFERENCES CITED

The following references are of record in the file of this patent:

UNITED STATES PATENTS

| Number | Name | Date |
|---|---|---|
| 153,854 | Skinner | Aug. 4, 1874 |
| 536,185 | Cook | Mar. 26, 1895 |
| 849,743 | Martin | Apr. 9, 1907 |
| 1,062,980 | Lewis | May 27, 1913 |
| 1,299,703 | Grey | Apr. 8, 1919 |
| 1,515,849 | Eppinger | Nov. 18, 1924 |
| 1,802,260 | Kopsho | Apr. 21, 1931 |
| 1,969,944 | Reinard | Aug. 14, 1934 |
| 2,140,724 | Stefan | Dec. 20, 1934 |
| 2,162,845 | Jones | June 20, 1939 |
| 2,481,445 | Premo | June 20, 1949 |

FOREIGN PATENTS

| Number | Country | Date |
|---|---|---|
| 195,578 | Switzerland | June 16, 1938 |